United States Patent [19]

Gendreu

[11] 4,224,507
[45] Sep. 23, 1980

[54] SYSTEM FOR TRACKING A MOVING TARGET WITH RESPECT TO A FRAME OF REFERENCE OF UNVARYING ORIENTATION AND FIXED ORIGIN RELATIVE TO EARTH

[75] Inventor: Robert Gendreu, Paris, France

[73] Assignee: Thomson-CSF, Paris, France

[21] Appl. No.: 952,127

[22] Filed: Oct. 17, 1978

[30] Foreign Application Priority Data

Oct. 21, 1977 [FR] France ............................... 77 31741

[51] Int. Cl.$^3$ ......................... G05D 3/00; G06G 7/80; G01S 9/42
[52] U.S. Cl. .................................. 235/412; 235/410; 343/5 ST; 343/7.4; 356/152
[58] Field of Search ................ 364/423; 235/410, 411; 343/5 ST, 7.4, 16 M

[56] References Cited

U.S. PATENT DOCUMENTS

| | | | |
|---|---|---|---|
| 3,223,996 | 12/1965 | Voles | 343/5 ST |
| 3,750,174 | 7/1973 | Belluck | 343/7.4 |
| 3,798,420 | 3/1974 | Kaaz | 235/411 |
| 3,798,425 | 3/1974 | Heard et al. | 235/411 |
| 3,821,738 | 6/1974 | Quesinberry et al. | 343/16 M |
| 3,838,423 | 9/1974 | Di Matteo | 343/16 M |
| 3,845,276 | 10/1974 | Kendy et al. | 235/411 |
| 3,952,304 | 4/1976 | Broniwitz et al. | 343/16 M |
| 4,124,849 | 11/1978 | Zahornasky et al. | 235/411 |
| 4,136,343 | 1/1979 | Heffner et al. | 343/16 M |
| 4,148,026 | 4/1979 | Gendreu | 343/5 ST |

Primary Examiner—Felix D. Gruber
Attorney, Agent, or Firm—Cushman, Darby & Cushman

[57] ABSTRACT

A system for tracking a moving target from a moving carrier. The tracking system is provided with a device for measuring the position of the target in relation to the carrier and with a servocontrol unit for servo controlling the aiming of the device. The error between the position of the target and a position estimated for it is given by the measuring device in spherical coordinates. The tracking system is further provided with a converting unit, in which the spherical coordinates are converted into cartesian coordinates. A frame of reference changing unit and a trajectory simulator of the target allow the position of the target to be calculated in relation to a cartesian frame of reference of unvarying orientation and fixed in relation to the earth. A frame of reference changing unit in the opposite direction and a unit for controlling the position of the device for measuring the position of the target on the basis of the simulated position coordinates allow through the servo control unit the aiming of the device for measuring the position of the target to be controlled.

20 Claims, 9 Drawing Figures

FIG_6

FIG_7

SYSTEM FOR TRACKING A MOVING TARGET WITH RESPECT TO A FRAME OF REFERENCE OF UNVARYING ORIENTATION AND FIXED ORIGIN RELATIVE TO EARTH

BACKGROUND OF THE INVENTION

This invention relates to a system for tracking a moving target, the said system itself being moving. It relates in particular to airborne radar systems, but also to systems on the ground or on board terrestrial or marine carriers.

Such systems include a locating and position measuring device in order to remain trained on the target. If, for example, radar is concerned, the locating and measuring device comprises a monopulse antenna associated with a transmitter and a receiver to supply range-measuring signals and signals representing angular divergence from the axis of the antenna. These signals are made use of by servo-controls which control the position of the antenna in such a way as to reduce error signals.

Each measurement which is made is subject to an error which is the resultant of errors of two kinds: statistical error and dynamic error. Statistical error, or measurement noise, can only be reduced by taking the mean of a number of successive measurements, which amounts to reducing the overall pass band of the system. However, processing of this kind results in a delay in servo-controlling the antenna, with the result that the later lags behind the event to be tracked, which thus gives rise to a dynamic error.

Reducing the resultant of statistical and dynamic errors can only result in a compromise between having a sufficiently narrow overall pass band for the system, which results in a small statistical error and a large dynamic error, and having a wider pass band, the effect of which is the reverse. This compromise is all the more difficult to put into practice in view of the fact that the solution adopted is not always applicable in every case. In effect, if the target is situated at long range, the measurement noise is low, and this permits a narrow pass band and reduced dynamic error. On the other hand, when range decreases, it is necessary to increase the pass band in order to reduce dynamic error, but this is done at the expense of measurement noise.

The accuracy of such systems is thus fairly limited, being of the order of 4 meters in respect of position and 10 meters per second in respect of speed for a target situated 1 kilometer away.

SUMMARY OF THE INVENTION

One object of the present invention is to avoid these disadvantages and restrictions.

In particular it eliminates a large proportion of the measurement noise, this noise being due to the conditions under which such measurements are normally made. The fact is that the measurements are made at a point distant from the centre of gravity of the carrier or from its instantaneous center of rotation. The measurements represent spherical coordinates referred to a moving frame of reference. These coordinates are not independent of one another and, what is more, they depend on the attitude of the frame of reference.

However, the frame of reference is subject to high-speed translatory and rotational movements due to vibration, torsion, and rotation of the carrier and to the carrier and to the servo-control mechanisms.

One object of the invention is to sense and measure variations in the attitude of the frame of reference used for the measurements and its instantaneous position, to enable the said measurements to be converted into cartesian coordinates referred to a stable frame of reference of unvarying orientation having a fixed origin.

Since this frame of reference is fixed (being an absolute frame of reference for example), measurements relating to the target are divested of a large part of their noise, which allows the processing circuits to have a narrow pass band and thus allows the target to be tracked with increased accuracy.

Another object of the invention is to provide coordinates for the instantaneous position, the instantaneous speed and the instantaneous acceleration of the target relative to the fixed frame of reference defined above, with a view to using these coordinates to determine the trajectory of a ballistic missile intended to hit the target.

In accordance with a feature of the invention, the measurements relating to the target which are made as spherical coordinates in a frame of reference related to the measuring means are converted into cartesian coordinates referred to a frame of reference of unvarying orientation having a fixed origin.

In this frame of reference, the effective value of the measurement noise, due chiefly to the shifting of the high spot on and near the target is not a variable and the kinematics of the target are unvarying. It is thus possible to achieve a genuine simulation of the trajectory of the target, with a certain amount of prediction, rather than simply processing the signals by integration for example. Simulation of this nature enable low dynamic errors to be achieved.

Since the pass band of the system which makes use of this simulation is narrow, the loss of part of the measurement information has no influence, or only a slight influence, on the results, by virtue of the memory function of the simulator. The loss of the measurement information may even be deliberate, as a result of the suppression of manifestly incorrect measurements, which reduces still further statistical errors after processing, or in the course of certain tactical maneuvers by the carrier.

BRIEF DESCRIPTION OF THE DRAWINGS

Other features and advantages will become apparant from the following description, which is illustrated by the figures, which show:

FIG. 9, an embodiment of the initialization circuits.

Figure 1:
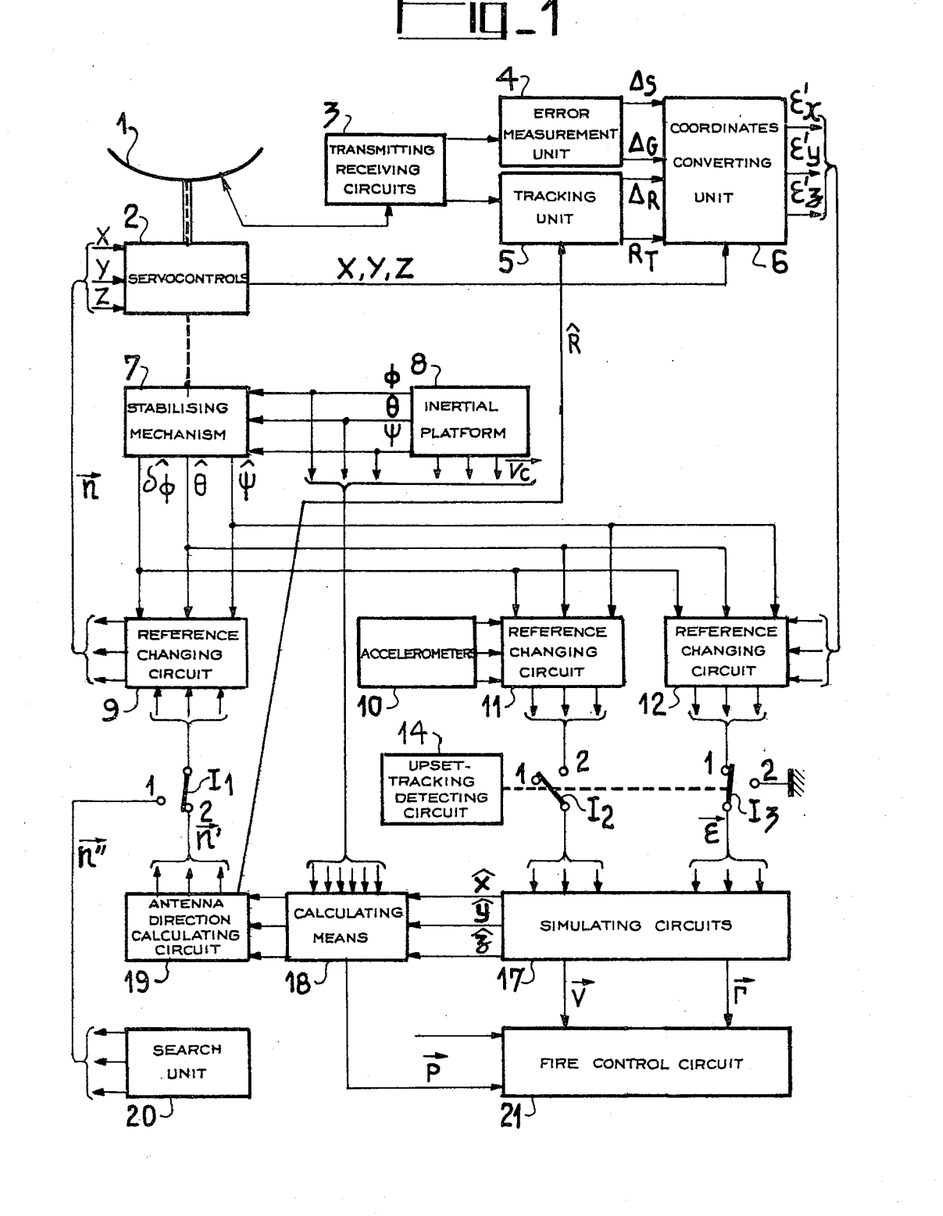
FIG. 1 a general block diagram of the system according to the invention.

The diagram shown in FIG. 1 is of a tracking radar installed on board an aircraft. This radar is intended to pick up echos from a given target (another aircraft for example). It has a movable antenna 1 of the monopulse type, that is to say an antenna which enables measurements to be made of the angular differences between the direction of the target and its projections onto two mutally perpendicular planes of symmetry. At the same time the radar measures the distance which separates the carrier aircraft from the target. The antenna, being movable in relation to the carrier, needs at all times to be pointed in the direction of the target by the trajectory simulator, and to be so steered as independently as possible of the angular movements of the carrier. To do this, the pointing is performed by servocontrols 2. The servocontrols are operated by a processing loop using the measurements made of the above mentioned differences. The loop needs to be of sufficiently high gain for the differences measured to be as small as possible, and it needs to have a narrow pass band in order to eliminate measurement noise as far as possible and thus to be subject to the minimum statistical error. This processing must obviously not be performed at the cost of dynamic error. It is for this reason that the processing loop contains simulating circuits 17 which at all times calculate the estimated kinematic parameters of the target (acceleration, speed, position) in relation to an absolute cartesion reference.

The results set forth above are achieved, in accordance with a feature of the invention, by means of pre-processing, coordinate changing, and frame of reference changing circuits so that the simulating circuits 17 make use of parameters which are free of a large part of their noise. In particular, these circuits enable the noise due to movements of the carrier to be eliminated, which noise could not have been eliminated by filtering since its spectrum is narrower than that due to the shifting of the high spot of the target. Furthermore, and this is an important point, these parameters have a narrow spectrum irrespective of the measurement noise of the radar, that is to say they change relatively slowly with time, whatever the attitudes of the carrier aircraft and the target.

Figure 2:
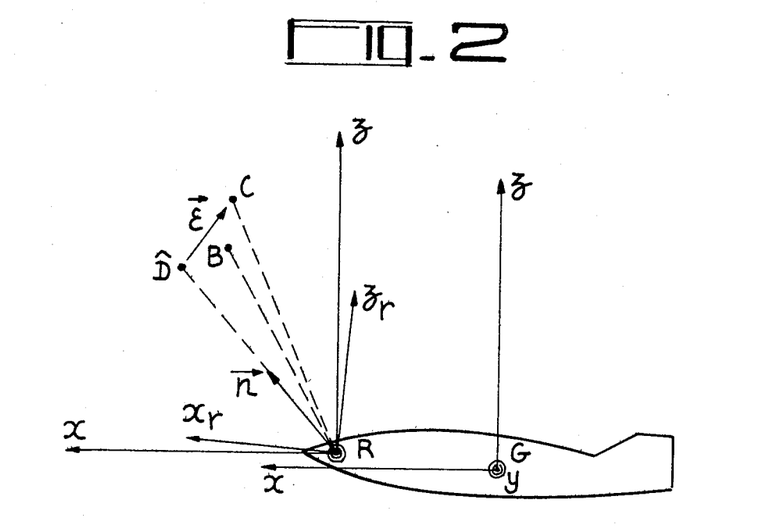
FIG. 2, the reference frames for measurement and processing.

FIG. 2 shows the three-axis frames of reference used in the system. The carrier aircraft contains the radar system situated forward at R.

The target is situated at B but the noise-distorted measurements made by the radar indicate a position C for the target. After processing, the estimated position of the target is $\hat{D}$ and its direction is represented by a unit vector $\vec{n}$.

The antenna of the radar is pointed in the direction of the vector $\vec{n}$. The measurements made by the radar are defined by the error vector $\vec{DC}=\vec{\epsilon}$.

The measurements made by the radar are made in the aircraft frame of reference (R, xr, yr, zr) and they are referred to the radar. Furthermore, they are made as spherical coordinates (range, elevation and azimuth). The use of such coordinates to operate servocontrols has many disadvantages. The coordinates are not independent of one another. The calculation of speed and position is complicated and it is very difficult to design trajectory simulation based on a simple model. If the same measurements are considered in an absolute cartesian frame of reference they reflect the kinematics of the target independently of those of the carrier aircraft. However, the kinematics of the target in an absolute cartesian frame of reference are equal to the resultant of those of the target measured with respect to the radar-related reference and those of this reference with respect to the said absolute cartesian frame of reference. The radar-related frame work has its origin in the nose of the aircraft. The latter is subject to vibration and deformation due to the flexibility of the fuselage, over and above the actual movements of the aircraft in rotation, translation, etc. The measurements made in the radar frame of reference are thus marred by a first error consisting of a known part (parallax) which is due to the movements of the radar reference frame in relation to an absolute cartesian reference, and by a second error due to the in situ flickering of the target (likewise a cartesian phenomemon). One of the objects of the invention is to eliminate these errors by referring the measured information back to a predetermined cartesian reference of unvarying orientation and fixed origin.

By choosing an earth-related cartesian reference, the movement of a body in such a frame is fully known simply from its absolute acceleration. Data is thus required on the absolute movement of the carrier because the radar only provides relative information. It would therefore be necessary at all times to know the position and attitude of the aircraft carrying the radar with respect to the ground.

To make use of a weapons system carried by the same aircraft, it would then be necessary to return to the aircraft-related frame of reference to aim the weapons and the radar.

In accordance with the invention, the measurement of the vector $\vec{\epsilon}$ which is performed by the radar is first subjected to transformation of its coordinates in the radar frame of reference (R, xr, yr, zr) to convert the original spherical coordinates into cartesian coordinates. These coordinates are then modified in a change of reference frame which consists in going from the radar frame of reference (R, xr, yr, zr) to a frame of reference (R, x, y, z) of unvarying orientation and origin R, and then to a frame of reference (G, x, y, z) parallel to the previous frame work but having an origin G, G being situated substantially at the instantaneous center of rotation of the carrier aircraft.

In the frame of reference selected, it is possible to calculate the kinematic parameters of the target from the data measured by the radar when transposed to this frame of reference. Calculation of these parameters becomes possible by adopting a simple model.

Figure 8:
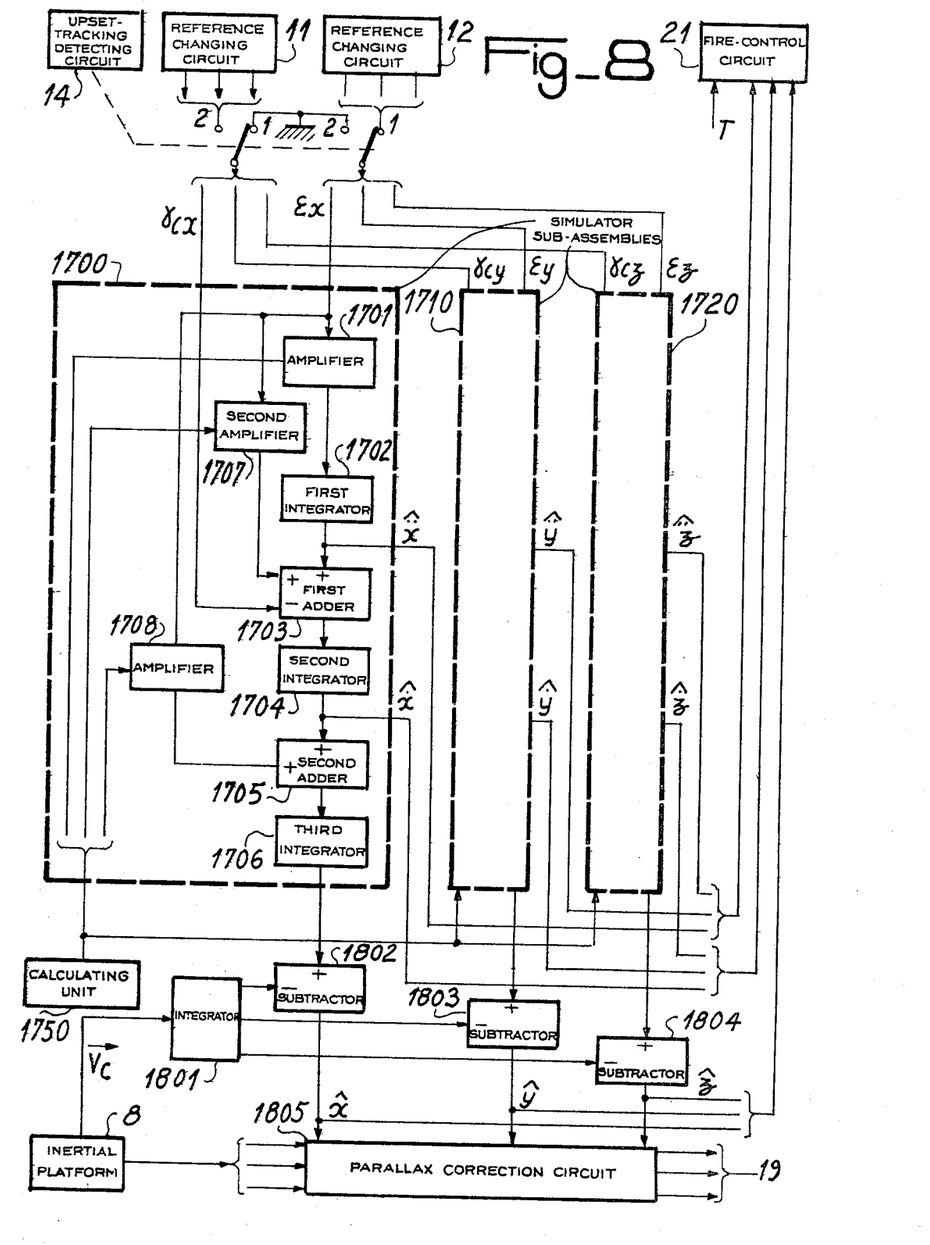
FIG. 8, an embodiment of the trajectory simulator.

With this model, it is assumed that the three components of acceleration are independent and are represented statistically by a Gauss-Markov process, that is to say a process in which change after a time t depends only on this time and not on the values of the process at previous times (a so-called non-remembering process). The state vector has nine components but is broken down into three independent vectors. Details of the simulator which employs this model will be given below (FIG. 8).

At the output of the simulator, the state vector for the target is referenced to an absolute cartesian frame of reference. The three position components are then transposed to the sliding frame of reference (G, x, y, z) and then to the frame of reference (R, x, y, z) by a correction for parallax, which finally enables the estimated direction $\vec{n}$ and range $\vec{R}$ of the target in the radar frame of reference to be determined.

The group of circuits making up the system according to the invention is thus shown in FIG. 1. This figure contains a number of blocks or units each of which performs a predetermined function. Each of these blocks or units is dealt with in detail in subsequent Figures.

The antenna 1 is trained by servocontrol members 2 in response to three coordinates of the best estimate vector $\vec{n}$ for the direction of the target, which are calculated by the simulator 17, estimate representing the group of values obtained for the parameters by an estimating operation. A unit 7 for stabilising the radar reference frame about the longitudinal axis of the aircraft, associated with an inertial platform 8, supports the assembly formed by the antenna 1 and its servocontrols 2. Unit 7 is a powerful mechanism having a single axis parallel in principle to the longitudinal axis of the aircraft, whose job is to stabilise the antenna unit 1. It assists the system to perform well by damping the large and rapid roll movements of the aircraft (0° to 360° at angular velocities of 100° to 200° per second). Unit 7 also produces, in response to $\phi$ (stabilisation error of the roll servomechanism) and items of attitude information $\theta$ and $\psi$ (longitudinal trim and heading) provided by the inertial platform 8, three corresponding items of information $\hat{\theta}$, $\hat{\psi}$ and $\delta\hat{\phi}$ of a higher resolution which define the radar frame of reference (which is related to the axis of the servomechanism) in relation to the local vertical and a geographic datum. These items of information are used to perform changes of reference in units 9, 11 and 12.

The servocontrols 2 comprise chiefly a mechanism having two degrees of freedom which carries the antenna 1 and which trains the axis of the radar beam in a direction in space which is defined in the radar frame of reference by the unit vector $\vec{n}$. This mechanism needs to be of high performance in order to reproduce the direction $\vec{n}$ with negligible errors.

A pulse radar (blocks 3, 4, and 5) is coupled to the antenna 1. This is the measuring member proper which provides values for angular and range deviation or for range deviation. The antenna itself is of the monopulse type and has a even diagram of the "sum" type and two odd diagrams of the "difference" type in elevation and azimuth respectively to allow these measurement signal to be obtained. The unit 3 is formed by the transmitting and receiving circuits of the radar. On the basis of the video signals supplied by the receiver of unit 3, unit 4 produces signals $\Delta S$ and $\Delta G$ for angular deviation. The purpose of unit 5 is to track the echo from the target, which is represented by a video pulse, in range. Measuring the out and back transit time of the pulse which is transmitted and then reflected by the target enables the range of the target to be estimated. A range-measuring marker in the form of a pulse is produced to represent the best estimate of range. The difference $\Delta R$ betwen the position of the echo and the range-measuring marker is made use of by the system in a manner which will be described further on in the specification.

The error measurements $\Delta S$, $\Delta G$ and $\Delta R$ supplied by the radar are relative to a system of spherical coordinates in a reference frame related to the radar.

A unit 6 is responsible for converting the spherical coordinates into cartesian coordinates in the three-axis radar reference frame. It thus gives the three cartesian coordinates $\epsilon'x$, $\epsilon'y$, and $\epsilon'z$ of the vector $\vec{DC}$ in relation to the radar reference frame (R, xr, yr, zr), D being the position estimated by the system and C the measured position of the target as seen from the focus of the antenna (FIG. 2).

Unit 12 then calculates the absolute components ($\epsilon x$, $\epsilon y$, $\epsilon z$) of vector $\vec{DC}$ in a reference frame (G, x, y, z) whose origin is substantially the centre of gravity or the instantaneous centre of rotation of the carrier aircraft (FIG. 2). To do this, it makes use of the best estimate data ($\hat{\psi}$, $\hat{\theta}$ and $\delta\hat{\phi}$) on the angular attitude of the radar reference frame, which is supplied by the stabilising unit 7 with the help of the inertial platform 8.

The absolute components calculated by unit 12 are transmitted to the simulator 17 via a switch $I_3$ which is controlled by a circuit 14 whose function will be described below. Switch $I_3$ is normally in the transmitting state in position 1. In position 2, its purpose is to eliminate and cancel out the measured values applied to the simulator 17 when these values are clearly erroneous. The position in which the switch is shown in the layout of the system is given in the Figure only as an example so that its function may be understood. It is clear that wrong measurements may be eliminated by other equivalent means.

The function of the simulator 17 is to simulate, that is to say to calculate the kinematic parameters of the target in an absolute reference frame parallel to reference frame (G, x, y, z) but having a fixed origin. Inter alia, it supplies the three co-ordinates $\hat{x}$, $\hat{y}$, $\hat{z}$, of the point D which represents the best estimate of the relative position of the target in this frame of reference. A calculating circuit 18 transposes the co-ordinates of D to reference frame (G, x, y, z) and corrects the values of these three components as a function of the parallax error RG using the data supplied by the inertial platform 8. The corrected co-ordinates are applied to a circuit 19 which determines on the one hand the distance R between the center of the antenna and the point $\hat{D}$ and on the other hand the three components of a unit vector $\vec{n}'$ which is homologous to vector $\vec{n}$ but in the reference frame (R, x, y, z). A frame of reference changing circuit 9 converts the co-ordinates of $\vec{n}'$ into the co-ordinates of $\vec{n}'$ in the frame of reference (R, xr, yr, zr) for the servo control 2. Like circuit 12, this reference changer makes use of the values $\delta\hat{\phi}$, $\hat{\theta}$ and $\hat{\psi}$ supplied by the stabilising unit 7 but it performs a conversion in the opposite direction.

Whilst the system is in the aquisition phase, the direction of the antenna unit is given not by the simulator but by a set of circuits represented by a block 20. This block is associated with a switch $I_1$ which substitutes for vector $\vec{n}'$, which cannot yet be calculated by block 19, a vector $\vec{n}''$ which sweeps a given space. The acquisition operations (searching for and detecting the target) rely on known techniques and for this reason will be described only so that the system may be properly understood.

Finally, a set of three accelerometers (block 10) at all times measure the kinematic changes to the carrier aircraft, in the form of an acceleration vector $\vec{\gamma}c$. The co-ordinates of $\vec{\gamma}c$ are transposed to the frame of reference (G, x, y, z,) by means of a reference changing circuit 11 identical to circuit 12 and are applied to the simulator 17 by means of a switch $I_2$ which is operated by circuit 14 in synchronisation with switch $I_3$. When the latter is in the transmitting state, switch $I_2$ is open (position 1). When switch $I_3$ is cancelling out the data applied to the input of the simulator, switch $I_2$ is closed (FIG. 2) and applies the acceleration co-ordinates for the carrier. Thus, during a period when the system is not locked on, the simulator is corrected by the acceleration of the carrier. This function is made possible by the system according to the invention. It enables the tracking of a target to continue even in the event of the measurement signals being lost by reason of fading, masking, jamming, etc. or in the course of a high-speed tactical manoeuvre by the carrier to alter the appearance it presents to the target.

Before a detailed description of the various blocks and of the ancillary items is given, a description of the overall operation of the system will allow the invention to be better understood.

In a first phase, unit 20 causes the radar to explore a wide area of space. It is during this phase that the detection of a target takes place. In a second phase, the target is automatically and continuously tracked by the system.

The search and detection operations rely on known techniques and are outside the scope of the present invention.

Only the automatic tracking of the target lies within the scope of the invention.

By way of illustration, the search (first phase) may be performed using a scanning pattern (block 20) which operates with the stablised frame of reference (R, x, y, z). The direction of search (vector $\vec{n}''$) is transmitted to the servomechanisms of block 2 (switch $I_1$ in position 1) with an intervening change of reference frame (block 9). The pattern enables the antenna beam to explore the solid angle containing a presumed target. This operation is generally monitored by the pilot on a CRT display which shows any echos there may be.

To lock the tracking system onto a target, the operator proceeds as follows:

He indicates to the system, by any known means, the range and direction of the echo to be tracked, which results in the antenna being brought to a halt in the desired direction. This instruction initiates an automatic range search for the target echo which is performed by shifting a rangefinding marker around the range preselected by the operator.

When the range tracking has locked on, that is to say when the position of the range-finding marker is slaved to that of the echo, the angular measurements $\Delta S$ and $\Delta G$ supplied by the error measurement unit 4 on the one hand and the range error $\Delta R$ on the other hand are applied to the simulator 17 after changes of co-ordinates and frame of reference at 6 and 12. In this phase, the effect of the errors $\Delta S$, $\Delta G$ and $\Delta R$ is to update the simulator 17 so that the position data which it supplies substantially corresponds to that for the target. This condition is achieved at the end of a preset delay. During this phase, switch $I_1$ has returned to position 2. The range-finding marker is slaved to the value $\hat{R}$ calculated by circuit 19. The radar is then governed in range by $\hat{R}$ and in direction by $\vec{n}$. The differences (vector $\vec{DB}$) between the values calculated by the simulator which are used to position the radar and the actual position of the target (point B) should be as small as possible.

The advantages of the invention is due to the fact that the changes of coordinates and frame of reference enable the processing of the differences to take place in an absolute cartesian frame of reference and that in this frame of reference the pass band of the system can be made considerably smaller. The result of this is on the one hand far better filtering of the measurement noise than in existing systems and on the other hand simple and effective simulation of kinematic parameters of the target, which reduces dynamic error. Owing to the fact that the system is able to anticipate the movements and position of the target accurately, the measurements may be filtered more satisfactorily. They may in particular be simply supressed when they are clearly false. In effect, the tracking may be upset for various reasons, such as noise, jamming, atmospheric interference, interference from the aircraft, decoys left by the target, residual ground echos, fading and masking effects which may result in the signal sometimes disappearing for several seconds. Such occurrences are detected by the unit 14 associated with the radar.

In all the above cases, the radar information is suppressed (switches $I_2$ and $I_3$ in position 2) and the simulator makes allowance for the maneuvers of the carrier. It maintains the relative trajectory of the target provided that the trajectory does not change during this period.

The sub-assemblies which are shown in the form of blocks in FIG. 1 correspond either to assemblies of electronic and electromechanical components or to assemblies of calculating circuits. Such calculating circuits can easily be constructed by the man skilled in the art simply from a knowledge of the equations to be solved. The calculating circuits may be equal in number to the calculating blocks although this is not the best solution. Preferably, a single computer will deal with all the calculations to be performed. It can be demonstrated, or checked, that the number of operations to be performed and the sum of the calculating times taken by these operations are still perfectly compatible with the pass band of the system and are the more easily so in the view of the fact that the band is narrow. For these reasons, the frequency and degree of accuracy of the calculations are sufficient indication to the man skilled in the art.

Figure 3:
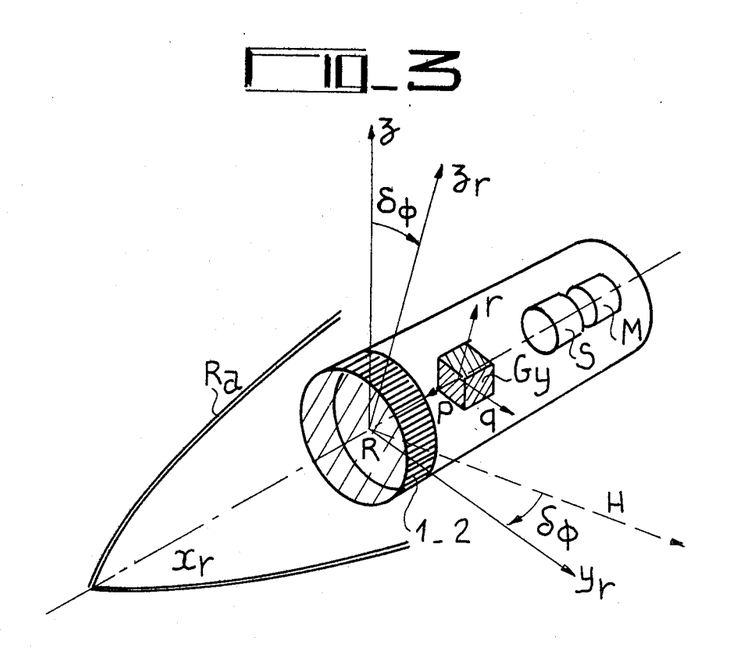
FIG. 3, a diagrammatic view of the roll stabilizing unit of the radar.

FIG. 3 shows the roll-stabilising unit for the moving frame of reference related to the radar. Tracking radars are generally installed in the pointed noses of their carrier aircraft and are protected by a radome Ra. The antenna unit 1 and the direction at servocontrol mechanisms 2 are shown in the form of a hatched cylinder whose centre is a point R which is the origin of the radar frame of reference. The antenna unit and a large part of the equipment are mounted on a frame (not shown) which is movable about an axis $Rx_r$, which axis is rarely parallel to the corresponding axis of the attitude sensor of the aircraft (the inertial platform 8).

Strict stabilisation is not required if the stabilisation error can be measured. However, the mechanism does need to be of a high standard. It comprises a servomotor M having a tachymetric generator, an angular position sensor S and possibly a rate-of-turn measuring unit Gy which emits three signals p, q, r which are represented in the Figure by three vectors parallel to the axes $Rx_r$, $Ry_r$ and $Rz_r$ respectively of the stabilised three-axis frame of reference of the radar.

In principle, the axis $Rz_r$ of the stablised three-axis system should lie in a vertical plane. In fact, axis $Rz_r$ is displaced from the vertical by an angle $\delta\phi$. This angle is measured by the sensor S and by the rate-of-turn measuring unit Gy (signal p) $\delta\phi$ is then used by the stabilising circuit to control the motor M in the manner shown in FIG. 4. The angle $\delta\phi$ is also shown between axis $Ry_r$ and a horizontal line H passing through R.

Figure 4:
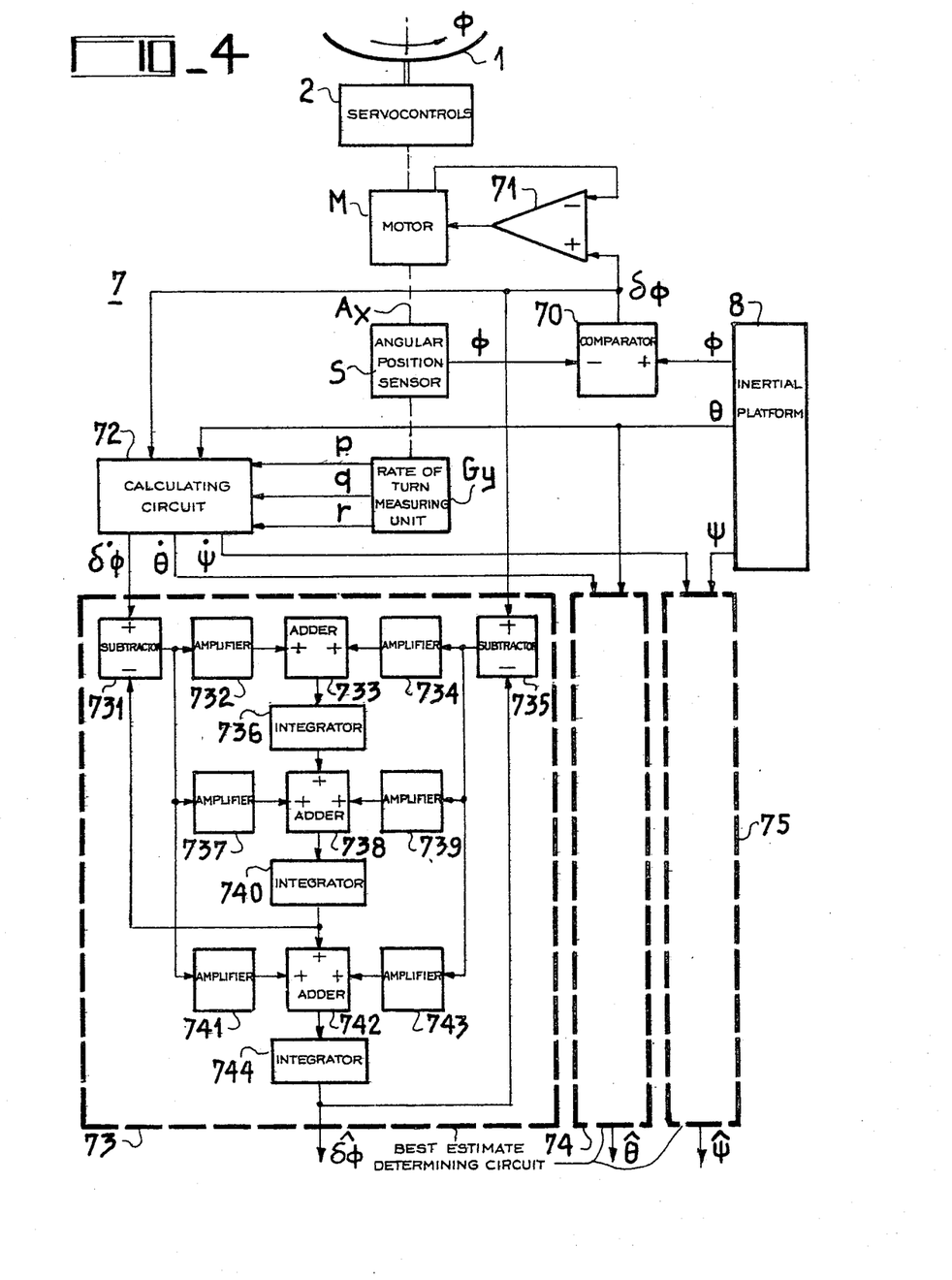
FIG. 4, the circuits for controlling the roll stabilizing unit.

FIG. 4 is a diagram of the servocontrol arrangement which uses the items of information $\phi$, $\theta$ and $\psi$ from the inertial platform 8 and which supplies the estimated values $\delta\phi$, $\hat{\theta}$ and $\hat{\psi}$ employed by the reference changing circuits. As in the other Figures, the signals which flow in the circuits shown in this Figure may be analog or digital. For this reason all the circuits shown are either analog or digital and in any case are familiar to and can be constructed by the man skilled in the art.

The servocontrol error $\delta\phi$ represents the residual angular attitude in roll of the unit carrying the antenna and of the reference frame of the radar. The antenna unit 1 and the servocontrol mechanisms 2 are movable about an axis Ax by means of a motor M having a tachometric generator, a position sensor S and a rate-of-turn measuring unit Gy which is intended to improve the accuracy with which $\delta\phi$ is known. The value for $\phi$ supplied by the inertial platform 8 is compared with that measured by the sensor S by a comparator circuit 70. The difference $\delta\phi$ is applied to a differential amplifier 71 which controls the motor M and which receives, as negative feedback, a signal from the tachometric generator associated with the motor.

For various reasons (the measurement noise of the inertial platform, elasticity in the body of the aircraft, local vibration at the point where the radar reference frame is sited) it may be necessary to improve the accuracy with which the angles $\delta\phi$, $\theta$ and $\psi$ are known by making a local measurement of the derivatives $\dot{\delta\phi}$, $\dot{\theta}$ and $\dot{\psi}$, which enables the received information to be heavily filtered to compensate for dynamic errors.

Since the derivatives $\dot{\delta\phi}$, $\dot{\theta}$ and $\dot{\psi}$ are not directly accessible to measurement, values for them are obtained from the signals p, q and r supplied by the rate-of-turn measuring unit Gy by means of a calculating circuit 72 which performs the following calculation, which is given in matrix form:

$$\begin{bmatrix} \dot{\delta\phi} \\ \dot{\theta} \\ \dot{\psi} \end{bmatrix} = \begin{bmatrix} 1 & 0 & 0 \\ 0 & \cos\delta\phi & -\sin\delta\phi \\ \sin\theta\cos\delta\phi \cdot \cos\theta & \sin\delta\phi \cdot \cos\theta \end{bmatrix} \times \begin{bmatrix} p \\ q \\ r \end{bmatrix}$$

using the values $\delta\phi$ and $\theta$ from the outputs of the comparator 70 and the platform 8 respectively, The signals $\dot{\delta\phi}$ and $\delta\phi$ are applied to a circuit 73 which determines the best estimate $\hat{\delta\phi}$. Similarly, the signals $\dot{\theta}$ and $\theta$ are applied to a circuit 74 identical to circuit 73 to enable $\hat{\theta}$ to be calculated and the signals $\dot{\psi}$ and $\psi$ are applied to a circuit 75 identical to circuit 73 for $\hat{\psi}$ to be calculated. Only circuit 73 is shown in detail in order to not to overload the Figure which shows a first subtractor 731 which on the one hand receives the signal $\dot{\delta\phi}$ from the calculating circuit 72 and on the other hand the output signal from an integrating circuit 740 which supplies a best estimate for $\dot{\delta\phi}$. The output of subtractor 731 is connected to three amplifiers marked 732, 737 and 741 respectively which have predetermined gains C1, C2 and C3.

Similarly, the signal $\delta\phi$ from comparator 70 and the signal $\hat{\delta\phi}$ from the output of circuit 73 are applied to a subtractor 735 whose output is connected to three other amplifiers 734, 739 and 743 whose respective gains are C4, C5 and C6.

An adder 733 is connected to outputs of amplifiers 732 and 734. It is followed by an integrator 736. A second adder 738 receives the signals emitted by integrator 736 and amplifiers 737 and 739 and is followed by a second integrator 740. Finally, a third adder 742 receives the output signals from integrator 740 and amplifiers 741 and 743 and is followed by an integrator 744 which emits the best estimate $\hat{\delta\phi}$.

Circuits 74 and 75 are identical to circuit 73 and provide the best estimates $\hat{\theta}$ and $\hat{\psi}$.

Figure 5:
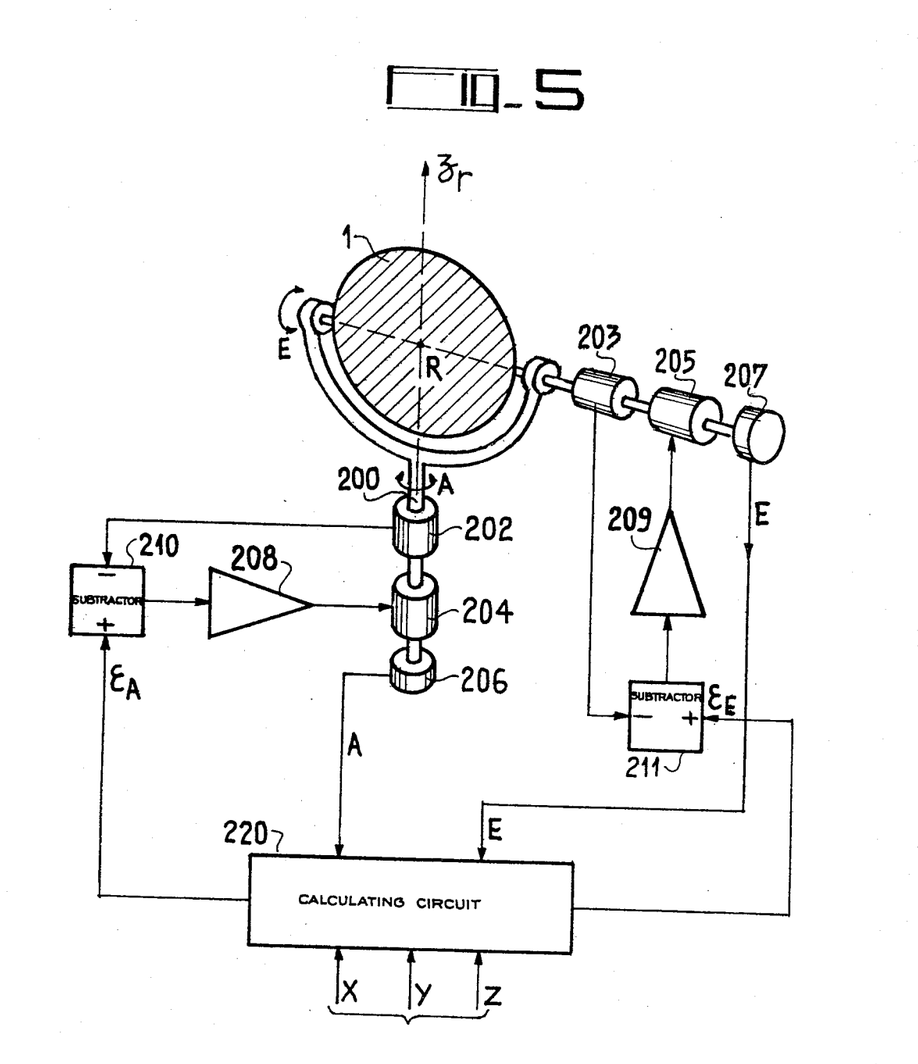
FIG. 5, the unit for servocontrolling the antenna of the radar directionally.

The antenna and its servocontrol circuits are shown in FIG. 5.

The antenna 1 may be a flat slot antenna whose beam depends on the radiating part.

It may also be an antenna of the inverted Cassegrain type which uses a movable reflector to swing the beam.

Both these types of antenna are well known. In particular they both enable "monopulse" functions to be achieved.

At transmission, the beam is generally in the form of a body of revolution and at reception microwave circuits form three channels:

a so-called "sum" channel corresponding to the transmission diagram, an "azimuth difference" channel which enables the angular deviation of the target in a horizontal plane to be computed, an "elevation difference" channel which enables the angular deviation in a vertical plane to be computed.

In both these cases two axes are required to orient the assumed body of revolution radar beam. In the case of the Cassegrain antenna, a swing by the beam through an angle of $\alpha$ is obtained by swinging the reflector through an angle $\alpha/2$.

The universal joint mounting shown in the Figure appears merely by way of example.

The point R at the center of the antenna represents the center of the radar frame of reference. The antenna is able to rotate about the axis Rzr through an angle A under the prompting of a motor 204 which is associated with a tachometric generator 202 and a position sensor 206. A is the value for azimuth.

The antenna is also turned about an axis perpendicular to axis Rzr by means of a motor 205, a tachometric generator 203 and a sensor 207 which emits a value E for elevation.

The tachometric generators make it possible to produce servocontrols having a short response time and a high static gain in order to reduce errors due to extraneous torques. These servocontrols need to be very carefully made (with very little play and clearance).

The three coordinates (X, Y, Z) of the unit vector $\vec{n}$ which is applied to the servocontrols are applied to a calculating circuit 220 which produces control signals $\epsilon A$ and $\epsilon E$, using also the value E for elevation and the value A for azimuth.

The values $\epsilon A$ and $\epsilon E$ are determined from the following equations:
in the case of a flat antenna:
azimuth axis $$\epsilon A = \frac{-X\sin A + Y\cos A}{\cos E}$$

elevation axis
$$\epsilon E = -(X\cos A + Y\sin A)\sin E + Z\cos E$$

in the case of a Cassegrain antenna having a moving reflector
azimuth axis $$\epsilon A = \frac{-(1+X)\sin A + Y\cos A}{\sqrt{2(1+X)}\cos E}$$

elevation axis $$\epsilon E = \frac{-(1+X)\cos A + Y\sin A \sin E - Z\cos E}{\sqrt{2(1+X)}}$$

in which A and E relate to the reflector.

To control the motor 204, the signal supplied by the tachometric generator 202 is subtracted from signal εA in a subtractor 210. The difference is amplified by an amplifier 208 and then applied to the control motor.

Similarly, motor 205 is controlled by the difference, formed in a subtractor 211, between εE, which is supplied by the calculating circuit 220, and the signal supplied by the generator 203, which difference is then amplified in an amplifier 209.

Of the radar, only the particular circuits which enable the signals for measuring the range error (FIG. 6) and the angular error (FIG. 7) to be obtained are shown.

However, by way of illustration, it may be mentioned that the transmitter of the radar is of the magnetron type, for example, and transmits recurrent microwave pulses of predetermined length to the antenna. The receiver is provided with automatic frequency control circuits which enable the frequency of the local oscillator to be slaved to the frequency of the transmitter except for the shift of the intermediate frequency (IF).

On reception, the signals in the three channels Σ ΔS and ΔG are raised to a suitable level by amplifiers, after the change of frequency. Automatic gain control circuits fed by the sum channel Σ are responsible for regulating the difference channels.

Figure 6:
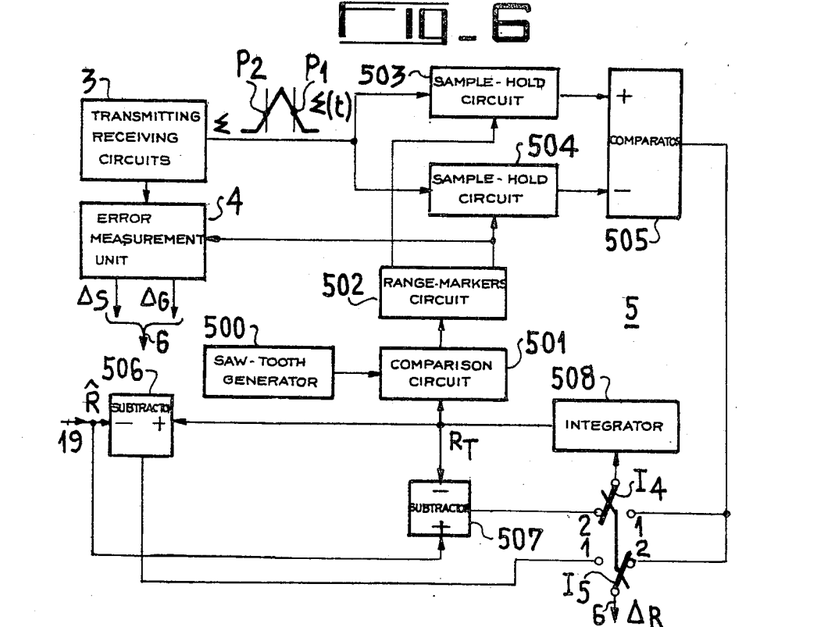
FIG. 6, the circuits for measuring range errors.

After detection, the sum signal Σ is applied to a matched filter which then emits an echo signal which is used for range measurement. This signal is shown in FIG. 6 at the output from block 3, which represents the transmitter and receiver.

This block 3 is connected on the one hand to error-measuring unit 4 which will be the subject of a detailed description (FIG. 7) and on the other hand to the range measuring circuits.

The distance from a point target to the focus of the antenna is obtained by measuring the out and back propagation time of the wave transmitted by the radar. Sequentially a comparison circuit 501 produces a pulse of calibrated length at the moment of intersection between a sawtooth signal supplied by a generator 500 and a continuous signal supplied by an integrator 508. It is assumed that the echo (the triangular signal Σ from the output of the receiver 3) appears approximately at this time. A circuit 502 for generating range-measuring markers receives the calibrated pulse from comparator 501 and produces two short sampling pulses P1 and P2 which coincide with the rising and decaying edges respectively of the calibrated pulse, for example. The pulses P1 and P2 are applied in the one case to a first sample-and-hold circuit 503 and in the other to a second sample-and-hold circuit 504 both of which receive the signal Σ. During pulses P1 and P2, these circuits allow measurements to be made of two instantaneous values for the amplitude of the echo in the form of two DC voltages, as shown by the inset diagram in FIG. 6. The voltages are applied to a comparator 505 which emits a difference representing the error in the position of the range measuring markers relative to the centre of the echo.

The lock-on phase of such an arrangement is not shown. It consists in shifting the range measuring markers at a sufficiently slow speed in the range band covered by the radar. Simple logic circuits enable automatic lock-on to take place at the moment when the markers find the echo.

By means of a group of two switches I4 and I5 and two subtractors 506 and 507, the circuits in FIG. 6 are able either to slave the estimated range R calculated from the simulator to the range measurement or to slave the range measuring markers to the estimated range R̂. This latter phase corresponds to the normal tracking phase.

The two subtractors 506 and 507 receive on the one hand the range $R_T$ from the output of integrator 508 and on the other hand the range R supplied by the simulator 19 but it is subtractor 506 which supplies the difference $R_T-R̂$. This is transmitted to the unit 6 by switch I5, which is in position 1. In position 2 this switch transmits the error ΔR which is supplied by comparator 505. Subtractor 507 supplies the difference $R̂-R_T$ to integrator 508 when switch I4 is in position 2. In position 1 it is the error ΔR which is applied to the integrator.

During the phase of setting up the simulator, the range measuring markers having first been locked on to the echo (switch I4 in the position 1), switches I4 and I5 remain in position 1. The arrangement emits the difference $R_T-R̂$, $R_T$ then being the actual range of the target. The difference tends towards zero; the estimated range R duplicates the range $R_T$. During this phase the range measuring circuits operate independently and do no more than measure the range $R_T$.

During the automatic tracking phase, setting up having taken place, the switches change to position 2. The range $R_T$ then duplicates the estimated range R̂. The range measuring markers are then slaved to the range R̂. The error ΔR which appears at the output of comparator 505 is then transmitted to block 6, towards the simulator.

Figure 7:
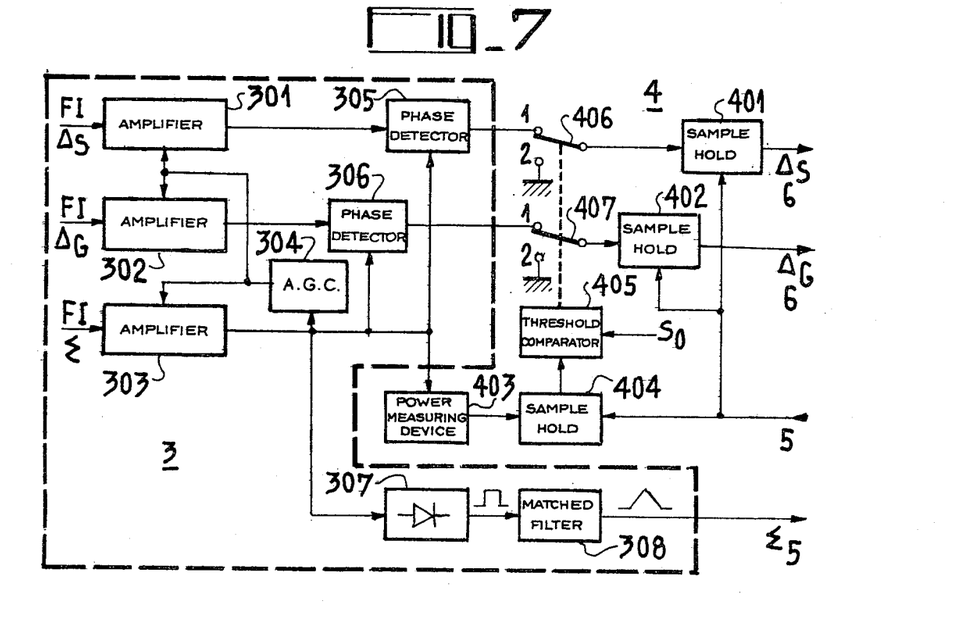
FIG. 7, the circuits for measuring angular deviation.

FIG. 7 is a diagram of the circuits for measuring the angular deviations ΔS, ΔG of the radar beam, by a known method amongst others. This Figure shows the final stages of the receiver 3 and the circuits belonging to block 4. The signals which arrive at these stages are the intermediate frequency (IF) signals Σ, ΔS and ΔG whose amplitude has not yet been standardised.

In simplified terms, these circuits together implement the approximation equation $$\beta = k \frac{\Delta}{|\Sigma|}$$

in which Δ is the signal on one of the different channels (ΔS or ΔG), which may be positive or negative, /Σ/ is the modulus of the sum signal, k is a constant, and β is the relevant angular measurement.

An intermediate amplifier 303 supplies the signal Σ to an automatic gain control circuit 304 in the receiver 3. Similarly the intermediate frequency (I F) difference signals ΔS and ΔG are transmitted by variable gain amplifiers 301 and 302, whose gain is controlled by the AGG (automatic gain control) circuit 304. The gain of amplifier 303 is also controlled by the AGG circuit. The difference signals are then demodulated using the sum signal in respective amplitude and phase detectors 305 and 306. The layout is a conventional one. The detectors 305 and 306 emit video-frequency measurements β corresponding to the values of ΔS and ΔG.

These measurements are exact when the target is a point and the levels of Δ and Σ are sufficient to swamp any interference signal and, in particular the receiver noise. In particular, this condition is met at short range (less than 1 kilometer for example) where the signal-to-noise ratio of radar is high.

In actual fact the target is rarely a point and allowance has to be made for its flicker. This phenomenon is the result of the interference between waves reflected by a number of reflective parts of the target and results mainly in a change in the direction of the wave received by the radar. It is as if the wave were coming from a single point source, termed a high spot, situated in a more or less restricted area around the actual position of the target. The phenomenon is related only to the geometrical characteristics of the target. Thus, the angular deviations become larger the shorter the distance from the radar to the target.

An arrangement which is shown in FIG. 7 enables the effects of target flicker to be reduced. It is based on the fact that any attenuation at a point in the received field (on the sum channel) is accompanied by a local distortion of the wave plane, entailing a more or less considerable deviation $\beta$. The deviation is in particular a maximum at the point where the field $/\Sigma/$ is at a minimum. Therefore, if the measuring system makes use of angular measurements, they may be degraded by a considerable amount of measurement noise. The arrangement thus measures the received power:

$$P_r = /\Sigma/^2$$

and compares it with a standing threshold So. When $P_r$ becomes lower than So, the aberrant measurements are suppressed and they are assigned a value of zero, which is the most probable value if the distribution is assumed to be centralised.

Thus, if FIG. 7 is referred to, the arrangement can be seen to comprise a device 403 for measuring the power $P_r$. This device simply determines the signal-to-noise ratio, which is all that is required and gives the value of $P_r$ in a very short space of time.

The signal $P_r$ is applied to a sample-and-hold circuit 404 which receives the calibrated pulse from block 5 which is used to produce the two range measuring markers. The sampled voltage is then applied to a threshold comparator 405, which receives a reference voltage So and which operates two switches 406 and 407 in synchronisation. In position 1, in which case the power $P_r$ is higher than the threshold So, the two switches transmit the video signals for the measured angular deviations $\Delta E$ and $\Delta S$ to sample and hold circuits 401 and 402 respectively. These sampling circuits are controlled by the same range-marker generating pulse from block 5. In position 2, that is to say when the threshold So is not exceeded, the switches 406 and 407 are connected to earth, that is to say to the zero reference potential, as indicated above.

The signals $\Delta S$ and $\Delta G$ supplied to block 6 are thus in the form of square waves of a voltage which may possibly be other than zero when 406 and 407 are in position 1 and which is zero when they are in position 2 and which have the same period as the range measuring pulses, that is to say the repetition period of the radar.

FIG. 7 also shows that in block 3 the intermediate frequency signal $\Sigma$ is applied to a detector 307 and then to a matched filter 308 which emits the triangular signal intended for unit 5 for range measuring purposes.

Studies have made it possible to assess the standard deviation $\sigma$ of the swing $\alpha$ as a function of So. In this way it was possible to find that the threshold So which led to only 50% of the information received by the radar being used would enable the standard deviation representing 100% of the measurements being used to be divided by approximately 3.5.

The three measurements, namely $\Delta S$ and $\Delta G$ supplied by unit 4 and $\Delta R$ supplied by unit 5, are intended for the simulator 17 after a change of coordinates (unit 6) and a change of reference frame (unit 12).

Unit 6 is in fact a calculating unit which associates the three error coordinates $\epsilon'x$, $\epsilon'y$, $\epsilon'z$, with the three spherical coordinates $\Delta S$, $\Delta G$, and $\Delta R$. What is involved is a matrix calculation, that is to say the solution of a set of three equations, which is performed in a known fashion by a calculating circuit specially programmed for this purpose.

In cases where the antenna is of the inverted Cassegrain type:

$$\begin{bmatrix} \epsilon'x \\ \epsilon'y \\ \epsilon'z \end{bmatrix} = \begin{bmatrix} X & YR_T & ZR_T \\ y - R_T(1 - \frac{Y^2}{1+X}) & R_T\frac{YZ}{1+X} \\ X & R_T\frac{YZ}{1+X} & -R_T(1 - \frac{Z^2}{1+X}) \end{bmatrix} \times \begin{bmatrix} \Delta R \\ \Delta G \\ \Delta S \end{bmatrix}$$

In the case of a conventional antenna (where the feed and radiating part forming a rigid assembly):

$$\begin{bmatrix} \epsilon'x \\ \epsilon'y \\ \epsilon'z \end{bmatrix} = \begin{bmatrix} X & -YR_T(X^2+Y^2)^{-\frac{1}{2}} & -ZR_TX(X^2+Y^2)^{-\frac{1}{2}} \\ YXR_T(X^2+Y^2)^{-\frac{1}{2}} & -ZYR_T(X^2+Y^2)^{-\frac{1}{2}} \\ Z\,0 & R_T(X^2+Y^2)^{\frac{1}{2}} \end{bmatrix} \times \begin{bmatrix} \Delta R \\ \Delta G \\ \Delta S \end{bmatrix}$$

Unit 12 receives the three components $\epsilon'x$, $\epsilon'y$ and $\epsilon'z$ and performs a conversion from the three-axis radar frame to the three-axis absolute frame and supplies three error coordinates $\epsilon x$, $\epsilon y$, and $\epsilon z$ by means of a matrix calculation.

$$\begin{bmatrix} \epsilon x \\ \epsilon y \\ \epsilon z \end{bmatrix} = \begin{bmatrix} a_{11} & a_{12} & a_{13} \\ a_{21} & a_{22} & a_{23} \\ a_{31} & a_{32} & a_{33} \end{bmatrix} \times \begin{bmatrix} \epsilon'x \\ \epsilon'y \\ \epsilon'z \end{bmatrix}$$

where:
$a_{11} = \cos\hat{\theta} \cdot \cos\hat{\psi}$
$a_{12} = -\cos\delta\hat{\phi} \cdot \sin\hat{\psi} + \sin\delta\hat{\phi} \cdot \sin\hat{\theta} \cdot \cos\hat{\psi}$
$a_{13} = \sin\delta\hat{\phi} \cdot \sin\hat{\psi} - \cos\delta\hat{\phi} \cdot \sin\hat{\theta} \cdot \cos\hat{\psi}$
$a_{21} = \cos\hat{\theta} \cdot \sin\hat{\psi}$
$a_{22} = \cos\delta\hat{\phi} \cdot \cos\hat{\psi} - \sin\delta\hat{\phi} \cdot \sin\hat{\theta} \cdot \sin\hat{\psi}$
$a_{23} = -(\sin\delta\hat{\phi} \cdot \cos\hat{\psi} + \cos\delta\hat{\phi} \cdot \sin\hat{\theta} \cdot \sin\hat{\psi})$
$a_{31} = \sin\hat{\theta}$
$a_{32} = \cos\hat{\theta} \cdot \sin\delta\hat{\phi}$
$a_{33} = \cos\hat{\theta} \cdot \cos\delta\hat{\phi}$ Unit 11 performs the same matrix calculation for the acceleration coordinates of vector $\vec{\gamma}_c$.

In fact, the coordinates of $\vec{\gamma}_c$ and of $\vec{\epsilon'}$ will be processed in the same calculating circuits at different times.

Unit 9 is also a matrix calculating unit, which performs a change of reference frame in the opposite direction giving, on the basis of the unit vector $\vec{n'}$ supplied by unit 19, the unit vector $\vec{n}(X, Y, Z)$ which is intended for use in servocontrolling the direction of the antenna and for the change of coordinates at 6.

$$\begin{bmatrix} X \\ Y \\ Z \end{bmatrix} = \begin{bmatrix} b_{11} & b_{12} & b_{13} \\ b_{21} & b_{22} & b_{23} \\ b_{31} & b_{32} & b_{33} \end{bmatrix} \times \begin{bmatrix} X' \\ Y' \\ Z' \end{bmatrix}$$

$$\text{with } \begin{bmatrix} b_{11} & b_{12} & b_{13} \\ b_{21} & b_{22} & b_{23} \\ b_{31} & b_{32} & b_{33} \end{bmatrix} \text{ transposed from } \begin{bmatrix} a_{11} & a_{12} & a_{13} \\ a_{21} & a_{22} & a_{23} \\ a_{31} & a_{32} & a_{33} \end{bmatrix}$$

In the frame of reference (G, x, y, z) of unvarying orientation which is related to the center of gravity of the carrier or to the instantaneous center of rotation or to a point close to one of these centres, the simulator for simulating the target trajectory (position, speed, acceleration) corrected by the radar tracking errors, is used to steer the antenna used by the radar and for the range measurement.

This tracking system, which is looped to the simulator, enables a best estimate of the kinematic parameters of the target to be obtained in accordance with a selected model.

The principle criteria governing the choice of the kinematic model rely on considerable simplifications.

It is assumed that in the frame of reference (G, x, y, z) the three coordinates x, y, z, of the target, and their derivatives, are independent.

The model for the acceleration of the target along each coordinate is a Gauss-Markov process (a process in which change after a time t depends only on this time and not on the values of the process of previous times, i.e. a so-called non-remembering process).

The standard deviation $\sigma\gamma$ for acceleration, and the time constant $\tau$ define the agility and manoeuvrability of the target. For each coordinate, the spectral density $a^2$ is linked to $\tau$ and $\sigma\gamma$ by the equation:

$$a^2 = 2\sigma\gamma^2/\tau$$

Speed and position are obtained by one and two integrations respectively.

With the model selected, the acceleration of the target is statistically omnidirectional and is represented by a Gauss-Markov process.

The nine components of the state vector are broken down into three independent groups:

$(x, \dot{x}, \ddot{x})$ $(y, \dot{y}, \ddot{y})$ $(z, \dot{z}, \ddot{z})$ which means that the calculations are considerably simplified.

The simulator is shown in FIG. 8. The following vector notation is used:

$\vec{P} = (x, y, z)$ $\vec{V} = (\dot{x}, \dot{y}, \dot{z})$ $\vec{\Gamma} = (\ddot{x}, \ddot{y}, \ddot{z})$ The simulator thus contains three independent sub-assemblies 1700, 1710 and 1720 which receive the error signals $\epsilon x$, $\epsilon y$, $\epsilon z$ respectively and which emit respective one of the three groups of state components mentioned above.

Only sub-assembly 1700 is shown in detail, the other two being identical.

It comprises in essence a chain of circuits connected in series; namely: an amplifier 1701 of gain K3 a first integrator 1702 or, to be more exact, a circuit whose transfer function is of the form $$1/(p + \frac{1}{\tau})$$

where p is the Laplace operator, a first algebraic adder 1703, a second integrator 1704, a second algebraic adder 1705 and a third integrator 1706.

It also contains a second amplifier 1707 of gain K2 which is connected between the input of the sub-assembly and an adding input of adder 1703, and a third amplifier of gain K1 which is connected between the input to the sub-assembly and an adding input of adder 1705.

Adder 1703 also has subtracting means which is with is intended to receive the component $\gamma$ ex, which is equal to zero when switch $1_2$ is in position 1.

The coefficients K1, K2 and K3 are real. They are also different for the three sub-assemblies in unit 17. Their values are calculated by a circuit 1750 which is shown in FIG. 9.

The amplifiers 1708, 1707 and 1701 and those of the other sub-assemblies may thus be variable gain amplifiers which are controlled by the calculating means 1730 1740 belonging to circuit 1750, as dictated by the position of a switch $I_6$.

The components $\hat{\ddot{x}}$ and $\hat{\dot{x}}$ become available from the outputs of integrators 1702 and 1704 respectively.

The same applies to sub-assembly 1710 in the case of the components $\hat{\dot{y}}$ and $\hat{y}$ and to sub-assembly 1720 in the cas of components $\hat{x}$ and $\hat{z}$.

The position components $\hat{x}$, $\hat{y}$, $\hat{z}$, supplied by members 1700 1710 and 1720 through subtractors 1802, 1803 and 1804 are referred to an absolute frame of reference, that is to say a frame having a fixed origin. Before being used in the servocontrol loop and by the fire-control means 21, these position components must undergo a translatory change of reference frame to restore them to the sliding frame (G, x, y, z,) shown in FIG. 2. For this purpose, the components of the speed $\vec{Vc}$ of the carrier are transmitted by the inertial platform 8 and integrated by an integrator 1801 which supplies the three components of the origin G relative to the absolute frame of reference used for simulation. The components of G are subtracted from the absolute position components by subtractors 1802, 1803, 1804. These subtractors thus give the estimated position $\hat{P}$. The $\hat{x}$, $\hat{y}$, $\hat{z}$ components of $\vec{P}$ are applied to a circuit 1805 which makes a correction for parallax $\vec{GR}$ using the state components $\phi$, $\theta$ and $\psi$ supplied by the platform 8, as indicated in FIG. 1. The output signals from circuit 1805 are finally applied to circuit 19 of the servocontrol loop. The nine state components are then conducted to the fire-control means 21 together with an indication T of the transit time of the projectile which is to be fired, and also to circuits for assisting the pilot which are not shown in FIG. 8.

The simulator 17, being looped to (see FIG. 1) the set of units 1805, 19, 9, 2, 3 (4 and 5), 6 and 12, which because of the transfer function of 1 have only a negligible effect, constitutes the filter which enables best estimates to be arrived at for position, speed and acceleration, given that the coefficients K1, K2, K3 are matched to the kinematics of the target and to the measurement noise of the radar.

The circuits which make up the unit 1750 which is used to determine the gain coefficients K1, K2 and K3 for the three sub-assemblies of the simulator are shown in FIG. 9.

These coefficients depend only on a, which is given by the equation $a^2 = 2\sigma\gamma^2/\tau$ and k which is the square root of the spectral density of the measurement noise.

The parameter a may be a datum which can be set by the pilot as a function of the linematics of the target, that is to say as a function of the type of target.

The composite and variable noise $k^2$ is measured and enables circuit 1740 to calculate the coefficients K1, K2 and K3 for each of the sub-assemblies of the simulator. The coefficient k may be measured for each coordinate, thus enabling the transfer function of the sub-assemblies of the simulator to be adapted to each coordinate.

To simplify FIGS. 8 and 9, it is assumed that the measurements made of k give three values K1, K2 and K3 which are identical for the three sub-assemblies 1700, 1710 and 1720.

The spectral density of the measurement noise $k^2$ is a function of frequency of the form:

$$k^2 = ko^2/[1+(f/B)^2]$$

To the extent that $B \gg f_o$, which is the frequency beyond which the signal becomes less than the noise, it can be assumed that the noise is white.

It is therefore sufficient to measure this noise in a frequency gate of width $\Delta f$ situated close to the frequency B.

The measurement circuits shown in FIG. 9 include frequency gates 1741, 1742 and 1743, that is to say band-pass filters of pass bands of width $\Delta f = $ approx. 2 Hz which receive signals $\epsilon x$, $\epsilon y$ and $\epsilon z$ respectively. These filters are followed by quadratic detectors 1744, 1745 and 1746 respectively which are connected to the calculating circuit 1740.

For each of the three coordinates, circuit 1740 thus calculates the coefficients K1, K2 and K3 which automatically regulate the tracking pass band of the simulator for the corresponding coordinates. It therefore has nine outputs.

When the noise $K^2$ becomes too great, the control circuit 14, which receives a threshold signal S1, compares the noise $k^2$ with the threshold S1 and, in the event of the threshold being exceeded, changes switches $I_2$ and $I_3$ from the position 1 to position 2. The simulator then holds in its memory the corresponding coordinates, possibly corrected for the acceleration of the moving carrier.

By way of exemple, the response time for the measurement of k and for the calculation of the coefficients K1, K2 and K3 is of the order of 0.5 seconds.

During the normal tracking phase, in the course of which the simulator operates normally using the error measurements supplied by the radar, switch $I_6$ is in position 2, the coefficients K1, K2 and K3 being supplied by circuit 1740.

However, in the course of the preliminary phases switch $I_6$, by changing to position 1, enables the simulator to be quickly initialised.

During this phase, switch $I_1$ is position 1. The antenna is held steady in an approximate direction given by the search unit 20. Switches $I_4$ and $I_5$ (FIG. 6) are in position 1, the range measurement being slaved independently to the actual range of the target $\Delta R$, which is applied to the input of unit 6, represents the difference $R_T - \hat{R}$, that is to say the range $R_T$ since the simulator, which is not yet operational, emits $\hat{R}=0$ via unit 19. It is the three components of the $R_T$ in the absolute frame of reference which are applied to the simulator.

Switch $I_6$ is now in position 1. The values of K1, K2 and K3 are programmed by circuit 1730. This circuit is a memory or a device for setting information: $K2 = K3 = 0$ and $K1 \neq 0$ is of a predetermined value. Via a loop consisting of units 17, 1805, 19, 5, 6 12 the final integrators in the sub-assemblies of the simulator update the corresponding three initial values (xo, yo, zo) such that:

$$\hat{R}o^2 = xo^2 + yo^2 + zo^2 = R_T^2.$$

Coefficient K1 is of a sufficiently high value to render the updating time negligible.

At the end of this initialisation phase, the positions of the switches become:

$I_4$ and $I_5$ in position 2: the range measuring range $R_T$ duplicates the range $\hat{R}o$ from the simulator.

$I_1$ in position 2: the errors $\Delta R$, $\Delta G$ and $\Delta S$ are applied to the simulator 17 after a change of coordinates (6) and of frame of reference (12) and the loop closes on the positional control for the antenna and the range measurement so that these errors can be cancelled out or reduced.

$I_6$ in position 2: the coefficients K1, K2 and K3 are calculated by circuit 1740 on the basis of a model, so that at any given time the system supplies a best estimate for the kinematic parameters of the target.

Since the actual noise $K^2$ only becomes known after a certain fairly short period, there is still a brief updating period at the end of which the coefficients K1, K2 and K3 come to their optimum values.

The task of unit 1805 in FIG. 8 is to make a correction for parallax for data simulated at point G rather than point R.

This unit calculates the vector:

$$\vec{RD} = \vec{GD} - \vec{GR}$$

which defines the estimated position D of the target in the stabilised frame of reference related to the focus of the antenna.

This correction is not always necessary. It depends on the size of the vector $\vec{GR}$ and the speed of the angular movements of the carrier, bearing in mind the level of performance aimed at.

The calculations to be performed are given by the matrix equation $$\begin{bmatrix} x' \\ y' \\ z' \end{bmatrix} = \begin{bmatrix} \hat{x} \\ \hat{y} \\ \hat{z} \end{bmatrix} - \begin{bmatrix} c_{11} & c_{12} & c_{13} \\ c_{21} & c_{22} & c_{23} \\ c_{31} & c_{32} & c_{33} \end{bmatrix} \times \begin{bmatrix} Rx \\ Ry \\ Rz \end{bmatrix}$$

wherein (Rx, Ry and Rz) are the coordinates of R in the three axis frame (G, x, y, z) and where $c_{11} = \cos\theta \cdot \cos\psi$
$c_{12} = -(\cos\phi \cdot \sin\psi + \sin\phi \cdot \sin\theta \cdot \cos\psi)$
$c_{13} = \sin\theta \cdot \sin\psi - \cos\phi \cdot \sin\theta \cdot \cos\psi$
$c_{21} = \cos\theta \cdot \sin\psi$
$c_{22} = \cos\theta \cdot \cos\psi - \sin\phi \cdot \sin\theta \cdot \sin\psi$
$c_{23} = -(\sin\theta \cdot \cos\psi + \cos\phi \cdot \sin\theta \cdot \sin\psi)$
$c_{31} = \sin\theta$
$c_{32} = \cos\theta \sin\phi$
$c_{33} = \cos\phi \cdot \cos\theta$ $\theta$, $\phi$ and $\psi$ being the items of data supplied by the inertial platform 8.

From the estimated coordinates $(\hat{x}' \hat{y}' \hat{z}')$ for the position of the target, which have been corrected for parallax, unit 19 (FIG. 1) works out the estimated range $\hat{R}$ and the directional coordinates for the target $(\hat{X}', \hat{Y}' \hat{Z}')$ in the reference frame $(R, x, y, z)$.

These items of data are obtained by the following calculations:

Range $\quad \hat{R} = (\hat{x}'^2 + \hat{y}'^2 + \hat{z}'^2)^{\frac{1}{2}}$

Direction $\hat{X}' = \hat{x}'/\hat{R}$ (vector $\vec{n}'$)

$\quad\quad\quad \hat{Y}' = \hat{y}'/\hat{R}$ $\quad\quad\quad \hat{Z}' = \hat{z}'/\hat{R}$ Unit 20 (FIG. 1) provides the coordinates of a vector $\vec{n}''$ which sweeps an angular field centred on a direction designated by the pilot for example. This direction is duplicated by the antenna servomechanisms during the search phase (switch $1_1$ in the position 1).

The search may also be made in an angular field centred on the axis of the aircraft.

The calculations performed for the search pattern depend on the scan patterns selected and form no part of the present invention. They have therefore not been described.

The unit 10 intended to indicate the acceleration $\vec{\gamma}c$ of the moving carrier is formed for example by a set of accelerometers. The acceleration of the carrier may also be found by differentiation from the speed $\vec{Vc}$ supplied by the inertial platform. Information of a higher standard may also be obtained if necessary by coupling the inertial platform to three accelerometers of moderate performance which are linked to the carrier at the centre of gravity G. An arrangement of this kind requires only one change of coordinates (unit 11) and three integrations and has the advantage of correcting the bias errors of the accelerometers.

The majority of the calculations performed in the system by the various units of which it is made up (FIG. 1) employ arithmetic and trigonometry and in exceptional cases, fractional exponents. The gain coefficients of the filters (in the trajectory simulator 17 for example) relate to continuous filtering. It is easy for the man skilled in the art to transpose those parts of the description where the techniques are clearly analogue to equivalent digital circuits. The calculating circuits (the coordinate and frame of reference changers, the simulator, etc.) in particular use signals in the form of coded samples.

In the simulator for example, the kinematic parameters for each of the three coordinates are produced by using the following equations:

acceleration: $\gamma_j - \gamma_{j-1} \neq\neq Te(2K3 - \alpha\gamma_{j-1})$ speed: $V_j - V_{j-1} \neq\neq Te(K2 \epsilon + \gamma_{j-1}) +$
$$\frac{Te^2}{2}(\epsilon K3 - \alpha\gamma_{j-1})$$

position: $P_j - jP - 1 \neq\neq Te\, V_{j-1} +$
$$\frac{Te^2}{2}(K2\epsilon + \gamma_{j-1}) - \frac{Te^3}{6}(\epsilon K3 - \alpha\gamma_{j-1})$$

where
$\gamma j$, $Vj$, $Pj$ are the values for acceleration, speed, and position at the time of calculation tj.

$\gamma_{j-1}$, $V_{j-1}$ and $P_{j-1}$ are the values for the same parameters at a previous time $t_{j-1}$, Te is the sampling period for the measurements, $\epsilon$ is the difference between the measure position and the estimated position at times tj−1 and tj, $\alpha$ is related to the time constant $\tau$ characteristic of the agility of the target by :$\alpha = 1/\tau$ Depending upon the value of Te, a linear interpolation may be necessary.

Calculation of the coefficients K1, K2 and K3 for the three coordinates is performed by circuit 1740. These coefficients relate to a steady-state system or to one whose statistical characteristics vary slowly (one slaved to the noise $K^2$ for example). The coefficients vary as a function of time during the period of acquiring the target (the initialisation of the filter) following laws given by solving a Ricatti system of differential equations. The responses are a function of k and a and of the initial conditions for the filter (simulator), namely the initial position, speed and acceleration and their inherent accuracy, which are set in the simulator. These laws are calculated in any known manner at the design stage, providing that the parameters set forth above are known. If steady state or virtually steady-state conditions are assumed, the asymptotic values of K1, K2 and K3 are, (at the end of a theoretically infinite time):

$K1 = (a/k)^{1/3}$ $K2 = (a/k)^{2/3}$ $K3 = a/k$

Circuit 1740 may therefore be produced in the following way: the values of K1, K2 and K3 are calculated in the course of designing the system by using a calculating machine to solve the above equations for various values of a and k, that is to say for various values of the signals supplied by detector 1744, 1745 and 1746. These values are then recorded in a read-only memory. The address of each of the values in the memory coincides with the digital signal produced by coding the output signals from the detectors. Thus for each value of $k^2$ supplied by a detector and for each value of a supplied by the pilot (by making a manual setting for example) there can be obtained, by suitable readout from the memory, three corresponding values I1, K2 and K3 which are intended for the appropriate sub-assembly of the simulator.

The invention is of course applicable to airborne tracking systems which, as a means of measurement, employ a radar associated with an antenna of the "monopulse" type together with electromechanical servocontrols, and calculating circuits similar to what has been described above. The various functions described may be combined in a single computor when all the information is processed in digital form. The narrow pass band of the system, due to the slow change in the parameters in the cartesian frame of reference of unvarying orientation allows the various functions to be dealt with on a time-sharing basis in a single computor. Depending upon the calculating speed and accuracy required, it may be an advantage to use a plurality of calculating means which are coupled together in a known fashion to increase their individual performance.

It is of course possible to employ up-to-date components such as micro-processors so that the various functions described can be accommodated in a small volume of space. The processing circuits according to the invention (for coordinate changing, frame of reference changing, noise detection, level detection, and simulation) rely to a large degree on arithmetic calculating units using programmable, reprogrammable or read/write memories such as are widely a available commercially at the present time. It is clearly within the capacity of the man skilled in the art to program the memories to perform the calculations mentioned in the present description.

The invention may also be applied to a tracking systems which employ light beams from devices such as lasers or 'lidars'. As in the case of radar, the light beam is emitted in a direction laid down by the simulator. The positional information supplied by the system is obtained in the manner normal with such systems. The information is then processed in the same way as in a radar system.

Finally, the invention may be applied in the sphere of sound wave (in the underwater field in particular).

What is claimed is:

1. A system for tracking a moving target with respect to a first frame or reference of unvarying orientation and fixed origin relative to the earth from a movable carrier, said system comprising means disposed on said carrier for measuring positional deviations of said target in a second frame of reference related to said measuring means, means disposed on said carrier for moving said measuring means, and means for controlling said moving means in response to said measured deviations, said controlling means comprising:

first means for converting said measured deviations relative to said second frame of reference into corresponding deviations relative to said first frame of reference;

an inertial platform disposed on said carrier including means for generating a signal related to the speed of said carrier;

first means, responsive to said corresponding deviations, for calculating the estimate position of said target relative to said first frame of reference, said calculating means including means for integrating said carrier speed signal and means responsive to said integrating means for generating a signal related to the estimated position of said target relative to said first frame of reference; and second means for converting said estimated position relative to said first frame of reference into a corresponding estimated position signal relative to said second frame of reference, said moving means being responsive to said corresponding estimated position signal.

2. Tracking system according to claim 1, wherein the controlling means further comprises first switching means and means for controlling said first switching means for prohibiting said corresponding deviations from reaching said first calculating means so as to suppress manifestly incorrect measurements of deviation.

3. Tracking system according to claim 2 wherein the controlling means further comprises means for measuring the acceleration of the moving carrier, and second switching means and means for controlling the second switching means, for applying the acceleration measurements to said first calculating means at predetermined times.

4. Tracking system according to claim 3, wherein the means for controlling the first and second switching means are the same, for applying the measurements of acceleration to said first calculating means at the same time as corresponding deviations are suppressed.

5. Tracking system according to claim 1 wherein:

said measuring means comprises an antenna of the monopulse type, a transmitter/receiver means connected to said antenna for measuring angular and range deviations in said second frame of reference related to the antenna;

said moving means comprises means for servocontrolling the antenna in a given direction $(\vec{n})$;

said tracking system further comprises means for measuring parameters $(\delta\hat{\phi},\hat{\theta},\hat{\psi})$ relating to the orientation of the antenna;

said first converting means comprises second calculating means responsive to said measured deviations for calculating the measurements of angular and range deviation into cartesian coordinates relative to a third frame of reference of substantially unvarying orientation whose origin is situated substantially at the instantaneous center of rotation of the carrier;

said second converting means comprising third calculating means for calculating the coordinates of the position of the target in said third frame of reference on the basis of the position coordinates supplied by said first calculating means, fourth calculating means for calculating the estimated range $(\hat{R})$ and the estimated direction $(\vec{n}')$ of the target in relation to said third frame of reference, and fifth calculating means for calculating the direction $(\vec{n})$ of the target in said second frame of reference, in order to control said servocontrols.

6. Tracking system according to claim 5, wherein said first converting means further comprises sixth calculating means, responsive to said measuring means, for calculating the difference $(\Delta R)$ between the measured range of the target $(R_T)$ and the estimated range $(\hat{R})$ supplied by said fourth calculating means.

7. Tracking system according to claim 6 further comprising search controlling means for supplying a direction of search $(\vec{n}'')$ in a predetermined pattern, and switching means $(I_1)$ for applying this direction $(\vec{n}'')$ to said fifth calculating means during the phase in which the system searches for the target, and the estimated direction $(\vec{n}')$ during the tracking phase.

8. Tracking system according to claim 6, wherein said means for calculating the difference $(\Delta R)$ comprises:

two sample-and-hold circuits which each receive the video reception signals $(\Sigma)$ from the receiver means and a control pulse (P1, P2,);

a first comparator circuit which supplies the difference $(\Delta R)$ between the amplitudes of the sampled signals, an integrator; a subtractor circuit which receives the estimated range $(\hat{R})$ of the target, the difference $(\hat{R}-R_T)$ being applied to the input of said integrator;

a comparator circuit which receives the range $(R_T)$ and a sawtooth signal supplied by a generator and which emits, when the two applied signals coincide a pulse of calibrated length; and a generator for generating range-measuring pulses (P1, P2) which coincide with the leading and trailing edges respectively of the calibrated pulse from the second comparator circuit to operate respective ones of the sample-and-hold circuits.

9. Tracking system according to claim 8, wherein said means for calculating the difference $(\Delta R)$ also includes switching means (I and I$_5$) to supply to said integrator a signal ($\Delta R = R_T - \hat{R}$) after system initialization and the output signal from said first comparator circuit during a phase in which the system is initialized.

10. Tracking system according to claim 5 further comprising means for measuring the acceleration of the carrier, means for transforming said measured acceleration to said third frame of reference, and switching means (I$_2$) to apply the coordinates of the acceleration of the carrier in said third frame of reference to said calculating means.

11. Tracking system according to claim 5 further comprising means for assisting in the piloting of the carrier and means for controlling the firing of a weapon on the basis of the parameters of the trajectory of the target which are supplied by said calculating means.

12. Tracking system according to claim 5, wherein said receiving means comprises means for sampling and for storing the angular deviation signals ($\Delta S$, $\Delta G$), means for measuring the energy of the reception signal ($\Sigma$), and means for operating the samplers, in synchronization with the range measuring markers, in such a way as to sample and store the values of the deviation signals ($\Delta S$, $\Delta G$) when the energy of the signal ($\Sigma$) is greater than a threshold (S) and to cancel out these values when the said energy is below a threshold (S$_o$).

13. Tracking system according to claim 1, wherein said calculating means comprises three independent circuits of identical structure, each of which has an input terminal to receive a deviation signal corresponding to a coordinate in said first frame of reference, first, second and third amplifiers whose respective gains, K, K$_2$ and K$_3$ can be controlled, a first integrator connected to the output of said first amplifier, a first adder connected to the output of said first integrator and of the second amplifier, a second integrator connected to the output of said first adder, a second adder connected to the output output of said second integrator, and a third integrator connected to the output of said second adder, to supply the appropriate component of the estimated position of the target.

14. System according to claim 13, wherein said first integrator has a transfer function of the form $$\frac{1}{p + 1/\tau}$$

in which p is the Laplace operator and $\tau$ is a time constant.

15. System according to claim 13, wherein said first adder has an additional inverting input to receive the appropriate coordinate of the acceleration ($\gamma c$) of the carrier.

16. System according to claim 13, further comprising for each of the coordinates of said corresponding deviations applied to said calculating means, means, responsive to said first converting means, for measuring the measurement noise (K$^2$), setting a parameter (a) representative of the kinematics of the target and calculating and controlling the gains (K1, K2, K3) of said first, second and third amplifiers of said calculating means.

17. System according to claim 16, wherein said means for measuring the noise (k$^2$) comprises for each coordinate, a frequency gate and a quadratic detector in series.

18. System according to claim 13 wherein said calculating means further comprises means for generating the gains (K$_1 \neq 0$, K$_2 =$ K$_3 = 0$) of said first, second and third amplifiers during the system initialization and switching means (I$_0$) for applying these values of gain to said amplifiers.

19. System according to claim 16 further comprising means for comparing the measured noise for each of the three coordinates with a threshold (S$_1$), and switching means (I$_3$) to prohibit said corresponding deviations from being applied to said calculating means and switching means (I$_2$) to apply the components of the acceleration of the carrier ($\gamma c$) to said calculating means, said switching means (I$_3$ and I$_2$) being responsive to said noises comparing means and operating when the noise levels are higher than said threshold (S$_1$).

20. Tracking system according to claim 5 wherein said means for measuring the parameters relating to the orientation of the antenna ($\delta \hat{\phi}, \hat{\phi}, \psi$) comprises:

a servomechanism for stabilizing a mechanical structure (Ax) supporting the antenna about a roll axis;

three rate of turn measuring meters linked to the said structure to measure the three mutually orthogonal components of the instantaneous rotation vector of the structure; and calculating circuits which make use of the heading ($\psi$) and pitch angle ($\theta$) of the carrier and of the angle ($\delta \theta$) representing the roll stabilization error which is supplied by the stabilizing servomechanism to supply a best estimate of the three angles ($\hat{\psi} \hat{\theta}$ and $\delta \hat{\phi}$) which define the absolute angular orientation of the said structure.

* * * * *